(No Model.)
R. BEAN.
BICYCLE SADDLE.
No. 341,547. Patented May 11, 1886.
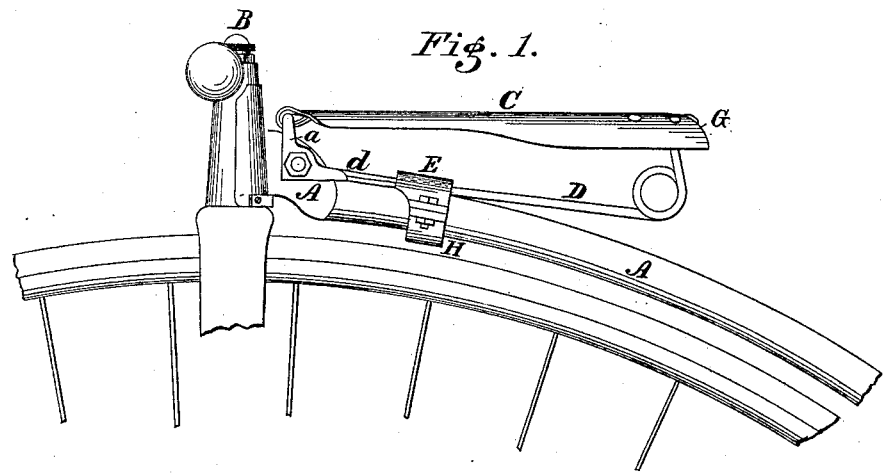
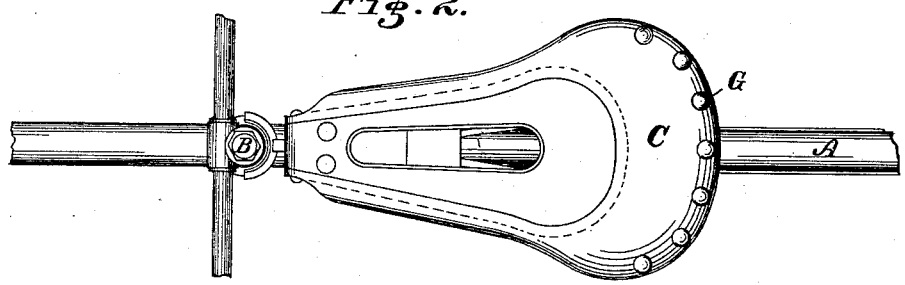
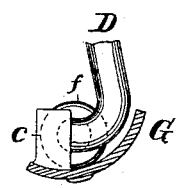 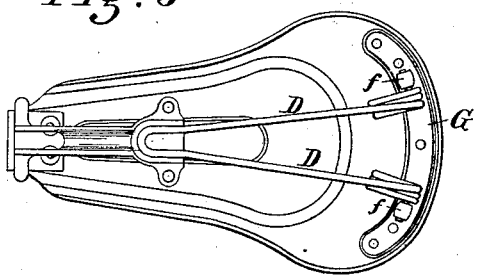 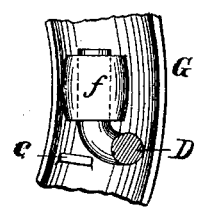
Witnesses
Chas. D. Davis.
Edwin L. Yewell.
Inventor
Roscoe Bean
Per C. M. Alexander
His Atty.

UNITED STATES PATENT OFFICE.

ROSCOE BEAN, OF SPRINGFIELD, OHIO.

BICYCLE-SADDLE.

SPECIFICATION forming part of Letters Patent No. 341,547, dated May 11, 1886.

Application filed May 12, 1885. Serial No. 165,220. (No model.)

*To all whom it may concern:*

Be it known that I, ROSCOE BEAN, a citizen of the United States, residing at Springfield, in the county of Clark and State of Ohio, have invented certain new and useful Improvements in Bicycle-Saddles, of which the following is a specification, reference being had therein to the accompanying drawings.

My invention relates to an improvement in bicycle-saddles, the object being to provide a light and elastic saddle which will adapt itself to the movements of the rider and the motions of the vehicle in such manner as will in the greatest degree contribute to the ease and comfort of the operator and at the same time be compact and durable.

A further object of the invention is also to produce a saddle that will not be liable to the derangement of parts that is common to many of the so-called adjustable saddles.

My invention further consists in the construction of a curved oval saddle-rib adapted to form a support to the rear part of the seat and to oscillate vertically with the upward or downward movement of the saddle.

It also relates to the novel method of constructing the supporting-spring and the manner of connecting the same to the curved saddle-rib and to the backbone or perch of the bicycle.

Another object of my invention is the construction of a bicycle-saddle seat in such manner as to prevent stretching or sagging, thereby dispensing with complicated appliances for taking up slack. With these ends in view I construct a flexible seat or saddle, which is attached in a permanent manner to the backbone or perch of the vehicle; but the construction and arrangements of parts are such that the saddle is self-adjusting, which will hereinafter be more fully described.

Referring to the accompanying drawings, which form a part of this specification, Figure 1 represents a side elevation of a portion of a bicycle having my saddle mounted thereon. Fig. 2 is a top plan view of the same. Fig. 3 is a plan view of the saddle in an inverted position. Fig. 4 is an end elevation of an inverted cross-section of the curved saddle-rib with a section of the spring attached. Fig. 5 is a plan view of the same.

Referring to the accompanying drawings, A represents the backbone or perch of an ordinary bicycle, which is attached to the head B in the usual manner, and constitutes no part of my invention, which relates solely to the construction of the saddle and the method of attaching it to the vehicle.

The seat or saddle proper, C, consists of a sheet of leather, which may be of the usual saddle form, as shown in Fig. 2. Underneath the leather is a strong canvas saddle similar in form and of suitable size, which is securely fastened to the leather seat by stitching or other suitable methods. This prevents the leather from stretching and sagging, thereby preserving the proper degree of tautness. The forward end of the saddle is narrowed to the form of a strap, which is passed over the top of the supporting-post $a$ and back through the loop in same and fastened securely by rivets or other suitable fastenings. The rear part of the saddle is turned over the curved rib G and securely fastened thereto.

The supporting-spring D is from preference made of one piece of wire, as shown in Fig. 3, the upper end of each coil terminating in an outward curve, forming a short trunnion, which is inserted in a suitable eye, $f$, attached to the under side of rib G, as shown in Figs. 3 and 5, and is held in position by means of the lug $c$, as shown in Figs. 4 and 5. The forward end of the supporting spring D is adapted to fit in a suitable housing provided for it in box E of the saddle-head or front support, which is from preference made in one piece, and consists, as a whole, of box E, connecting-plate $d$, and upright standard $a$, as shown in Fig. 1.

The advantages derived from thus making the entire saddle-head in one piece are obvious, since it thereby prevents the liability of the derangement of parts that might otherwise occur.

The supporting-spring D may be made of separate wires, thereby constituting two springs; but, as previously stated, is from preference made of one piece, as shown in Fig. 3, with the front end doubled and bent upon itself. The opposite ends, extending back and diverging from each other, are attached to the curved saddle-rib in the manner described, thus forming a hinge.

It will be observed that I employ a long spring, extending forward under the saddle to a point in front of the center, which is for the purpose of securing great flexibility, thus greatly increasing the elasticity of the seat. Box E is adapted to fit transversely on the backbone or perch, and is also adapted to engage with clip H, which is adapted to fit in like manner on the under side of the backbone, and is connected with box E by means of bolts, thus securely holding the saddle-head and supporting-spring in place. The front part of the saddle-head is adapted to be attached to the forward part of the backbone A, and is secured by a bolt which passes through the head laterally, as shown in Fig. 1. The upright supporting-post *a* is pivoted to the forward end of the backbone close to the head. It will therefore be readily seen that with this construction the pivotal point of the supporting-post is brought into close proximity to the steering-head. The position of the post being vertical the weight is thereby thrown squarely upon the point best adapted to support it; and, furthermore, this construction is compact, light, strong, and in no way liable to get out of order.

In all classes of bicycle-seats called "flexible," when the rider is mounted on his seat his weight causes the center of the saddle to sink more or less, and when passing over rough ground or coming in contact with an obstacle the sudden jar or bounce greatly increases this tendency; hence it will readily be seen that if the curved saddle-rib under the rear part of the seat be stationary or in a rigid position the sinking of the center of the saddle will cause the ends of the curved rib to become uncomfortably prominent, and the rougher the ground the more they protrude. To overcome this serious defect is one of the prime objects of my invention, which is successfully accomplished by the employment of the curved adjustable rib G, which, being hinged to the supporting-spring D in the manner described, is adapted to oscillate with the motions of the rider and conforms strictly to his form and movements, which, together with the long flexible spring D, provides the greatly-desired feature in a bicycle-saddle—viz., an easy elastic seat that conforms to the form and motions of the rider under all circumstances.

Having thus fully described my invention, what I claim is—

1. The combination, with a treeless bicycle-saddle, of a non-yielding support secured to the front or nose thereof and secured directly to the backbone, and provided with a rearward extension terminating in a clip, and an independent yielding support secured to the rear of the saddle, passing forward and secured to the backbone by said clip.

2. The combination, with a treeless bicycle-saddle, of a non-yielding support secured to the front or nose thereof and to the backbone, and having a rearward extension terminating in a clip which embraces the backbone, a metallic segment secured to the rear end of the saddle, and a spring whose ends connect with the said segment and whose forward portion is held to the backbone by the said clip.

3. In a bicycle-saddle, a saddle-support consisting of an upwardly-extending member having an aperture for attachment to and divided so as to embrace the backbone, and forming a support for the nose of the saddle, and of a rearwardly-extending member terminating in a clip adapted to embrace the backbone.

In testimony whereof I affix my signature in presence of two witnesses.

ROSCOE BEAN.

Witnesses:
 GEO. A. BEARD,
 JAS. S. BOGLE.